US012586301B1

(12) United States Patent
Byun

(10) Patent No.: US 12,586,301 B1
(45) Date of Patent: Mar. 24, 2026

(54) CUSTOM BLENDING FOR TRANSPARENT LAYERS

(71) Applicant: Apple Inc., Cupertino, CA (US)

(72) Inventor: Dong Joo Byun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 237 days.

(21) Appl. No.: 18/470,866

(22) Filed: Sep. 20, 2023

Related U.S. Application Data

(60) Provisional application No. 63/376,482, filed on Sep. 21, 2022.

(51) Int. Cl.
*G06T 15/50* (2011.01)
*G06F 3/04815* (2022.01)

(52) U.S. Cl.
CPC ........ *G06T 15/506* (2013.01); *G06F 3/04815* (2013.01); *G06T 15/503* (2013.01)

(58) Field of Classification Search
None
See application file for complete search history.

(56) References Cited

U.S. PATENT DOCUMENTS

| | | | | |
|---|---|---|---|---|
| 11,699,263 B2 * | 7/2023 | Ziegler | ..................... | G06T 7/50 |
| | | | | 345/426 |
| 2004/0184013 A1 | 9/2004 | Raskar | | |
| 2021/0350607 A1 | 11/2021 | Akenine-Moller | | |
| 2022/0284657 A1 * | 9/2022 | Müller | ................... | G06N 3/084 |

FOREIGN PATENT DOCUMENTS

CN 111968215 A 11/2020

* cited by examiner

*Primary Examiner* — Nurun Flora
(74) *Attorney, Agent, or Firm* — Blank Rome LLP

(57) ABSTRACT

In "extended reality" (XR) environments, it is possible to shoot or "march" a group of light rays from the location of an eye of a viewer to one or more graphical components in a 3D space rendered in the XR environment. If a ray from the viewer's eye intersects with a graphical object(s) in the 3D space, it is possible to calculate the various point(s) of intersection of the ray with the graphical object, as well as normal vectors in 3D space to such points of intersection. With this information, various lighting/shading effects may be determined and, if desired, applied to the graphical objects. However, such graphical techniques may be made more efficient by performing the rendering of a 2D representation of a graphical object specified by one or more 3D components in a single pass operation—and, optionally, with enhanced blending and lighting effects based on the viewer's location.

20 Claims, 6 Drawing Sheets

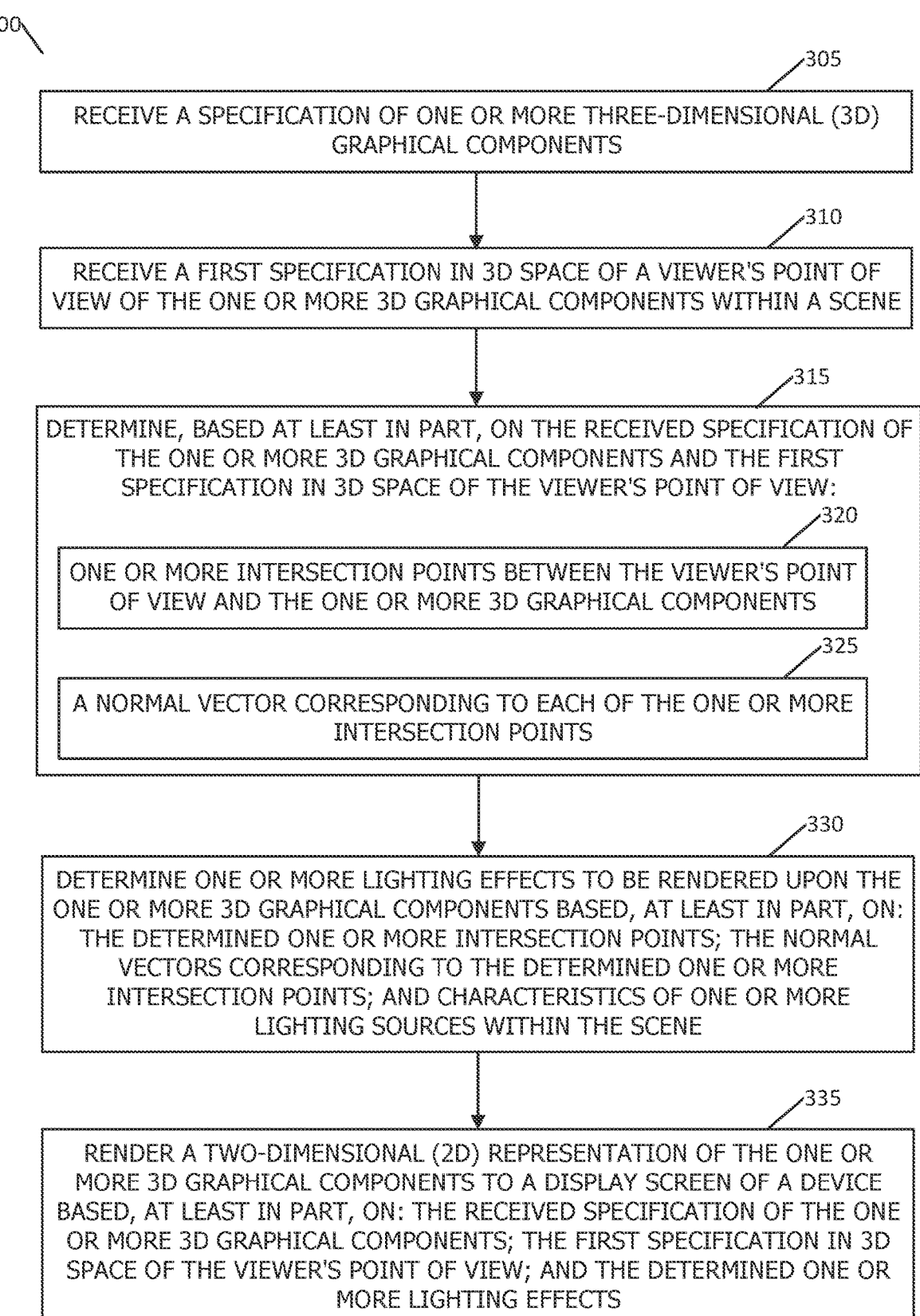

300

305

RECEIVE A SPECIFICATION OF ONE OR MORE THREE-DIMENSIONAL (3D) GRAPHICAL COMPONENTS

310

RECEIVE A FIRST SPECIFICATION IN 3D SPACE OF A VIEWER'S POINT OF VIEW OF THE ONE OR MORE 3D GRAPHICAL COMPONENTS WITHIN A SCENE

315

DETERMINE, BASED AT LEAST IN PART, ON THE RECEIVED SPECIFICATION OF THE ONE OR MORE 3D GRAPHICAL COMPONENTS AND THE FIRST SPECIFICATION IN 3D SPACE OF THE VIEWER'S POINT OF VIEW:

320

ONE OR MORE INTERSECTION POINTS BETWEEN THE VIEWER'S POINT OF VIEW AND THE ONE OR MORE 3D GRAPHICAL COMPONENTS

325

A NORMAL VECTOR CORRESPONDING TO EACH OF THE ONE OR MORE INTERSECTION POINTS

330

DETERMINE ONE OR MORE LIGHTING EFFECTS TO BE RENDERED UPON THE ONE OR MORE 3D GRAPHICAL COMPONENTS BASED, AT LEAST IN PART, ON: THE DETERMINED ONE OR MORE INTERSECTION POINTS; THE NORMAL VECTORS CORRESPONDING TO THE DETERMINED ONE OR MORE INTERSECTION POINTS; AND CHARACTERISTICS OF ONE OR MORE LIGHTING SOURCES WITHIN THE SCENE

335

RENDER A TWO-DIMENSIONAL (2D) REPRESENTATION OF THE ONE OR MORE 3D GRAPHICAL COMPONENTS TO A DISPLAY SCREEN OF A DEVICE BASED, AT LEAST IN PART, ON: THE RECEIVED SPECIFICATION OF THE ONE OR MORE 3D GRAPHICAL COMPONENTS; THE FIRST SPECIFICATION IN 3D SPACE OF THE VIEWER'S POINT OF VIEW; AND THE DETERMINED ONE OR MORE LIGHTING EFFECTS

FIG. 3

CUSTOM BLENDING FOR TRANSPARENT LAYERS

BACKGROUND

This disclosure relates generally to image processing. More particularly, but not by way of limitation, this disclosure relates to techniques and systems for rendering three-dimensional (3D) shapes in two-dimensional (2D) space using efficient fragment shaders and enhanced blending and lighting effects.

Some electronic devices are capable of generating and presenting so-called "extended reality" (XR) environments on display screens, such as head mounted devices (HMD), or the like. An XR environment may include a wholly- or partially-simulated environment, including one or more virtual objects, which users of such electronic device can sense and/or interact with. In XR, a subset of a person's physical motions, or representations thereof, may be tracked, and, in response, one or more characteristics of the one or more virtual objects simulated in the XR environment may be adjusted in a manner that comports with at least one law of physics. When 2D and/or 3D graphical content is displayed in XR environments, novel graphical blending techniques and enhanced lighting techniques, such as those disclosed herein, may be employed to improve the appearance of such graphical components—as well as the efficiency with which they are generated.

In XR environments, it may be possible to shoot or "march" a group of light rays from the location of an eye of a viewer to one or more graphical components in a 3D space being rendered in the XR environment. If a ray from the viewer's eye intersects with a graphical object(s) in the 3D space, it is possible to calculate the various point(s) of intersection of the ray with the graphical object, as well as normal vectors in 3D space to such points of intersection. With this information, various lighting/shading effects may be determined and, if desired, applied to the graphical objects to provide more "realistic" lighting and shading effects on the graphical objects from the point of view of the viewer. However, such graphical techniques may be made more efficient by performing the rendering of a 2D representation of a graphical object specified by one or more 3D components in a single pass operation- and, optionally, with enhanced blending and lighting effects based on the viewer's location.

BRIEF DESCRIPTION OF THE DRAWINGS

FIG. 3 shows a flowchart of a technique for rendering a 2D representation of one or more 3D graphical components to a display screen of a device in a single pass rendering operation, according to one or more embodiments.

DETAILED DESCRIPTION

Figure 1:
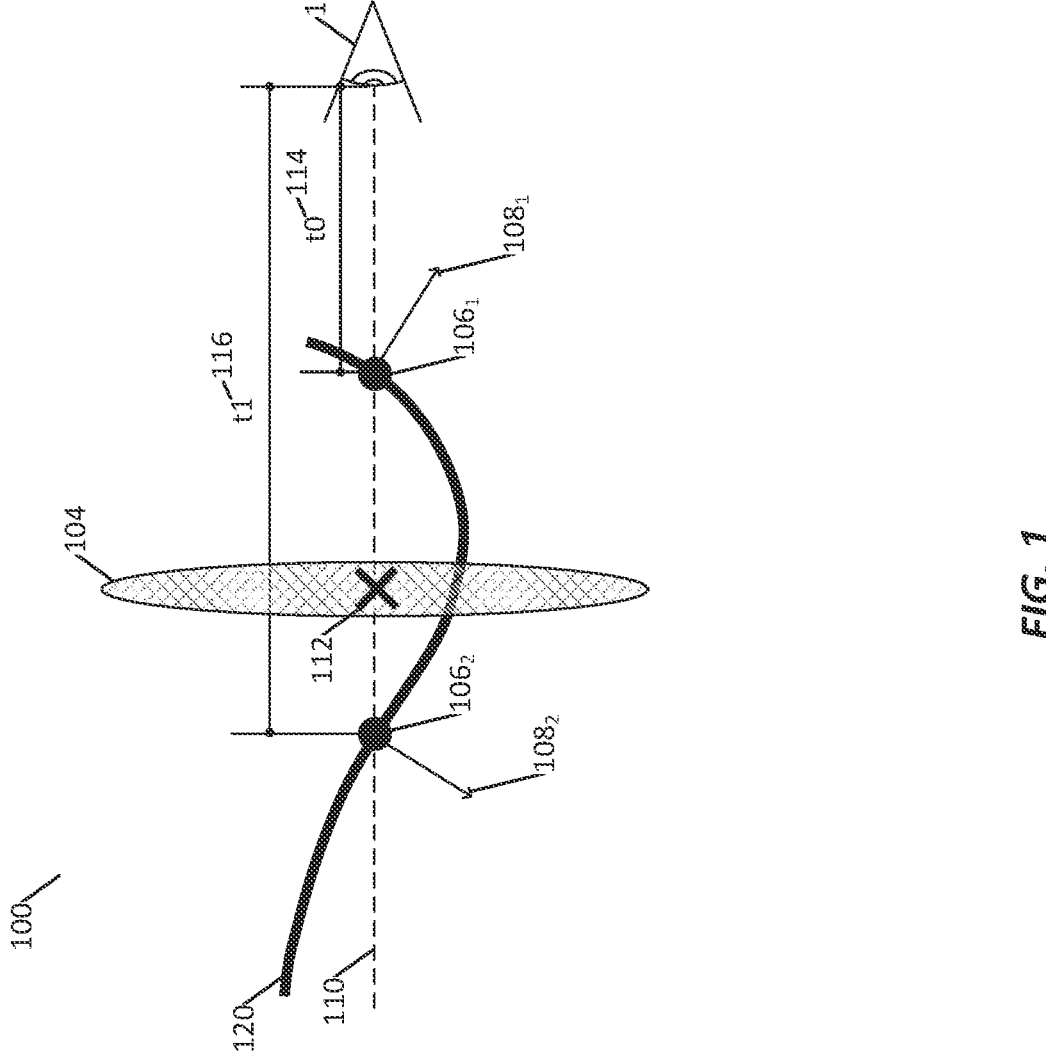
FIG. 1 shows an example of calculating points of intersection between a viewer's point of view and a 3D graphical component, according to one or more embodiments.

This disclosure pertains to systems, methods, and computer readable media to render 2D representations of a graphical object specified by one or more 3D components in a single pass operation, e.g., within XR environments. According to the techniques disclosed herein, enhanced blending and lighting effects may also be rendered on the graphical objects, e.g., based on a viewer's location in 3D space with respect to such graphical objects.

As mentioned above, the techniques described herein may provide enhancements for rendering and presenting graphical information, such as the aforementioned 2D and/or 3D graphical content, in extended reality (XR) environments. Some XR environments may be filled (or almost filled) with virtual objects or other simulated content (e.g., in the case of pure virtual reality (VR) environments). However, in other XR environments (e.g., in the case of augmented reality (AR) environments, and especially those wherein the user has a wide field of view (FOV), such as a horizontal FOV of 70 degrees or greater), there may be large portions of the user's FOV that have no virtual objects or other simulated content in them at certain times. In other cases, the virtual objects (and/or other simulated content) in an XR environment may be located at such large scene depths that it does not need to be rendered by the electronic device, as it would not take up a noticeable or perceptible portion of the user of the electronic device's FOV.

Thus, what is needed are improved techniques for rendering graphical content, such as 2D and/or 3D graphical content, in an XR environment that provide for improved user experiences and more efficient graphical processing operations. For example, such improvements may be realized by performing single pass rendering operations, custom blending techniques, and/or enhanced lighting effects, including precalculated occlusion masks.

In one or more embodiments described herein, a device for rendering 2D graphical information is disclosed, comprising: a memory; a display screen; and one or more processors operatively coupled to the memory, wherein the one or more processors are configured to execute instructions causing the one or more processors to: receive a specification (e.g., a mathematical or otherwise parameterized specification) of one or more 3D graphical components; receive a first specification in 3D space of a viewer's point of view of the one or more 3D graphical components within a scene; and determine, based at least in part, on the received specification of the one or more 3D graphical components and the first specification in 3D space of the viewer's point of view: a) one or more intersection points between the viewer's point of view and the one or more 3D graphical components; and b) a normal vector corresponding to each of the one or more intersection points.

The device may then further determine one or more lighting effects (e.g., light spill, blur, glow, bloom, etc.) to be rendered upon the one or more 3D graphical components based, at least in part, on: the determined one or more intersection points; the normal vectors corresponding to the determined one or more intersection points; and characteristics (e.g., light color, light intensity, light angle, light placement, or light distance from the viewer) of one or more lighting sources (e.g., virtual and/or real lighting sources) within the scene; and, finally, render a 2D representation of the one or more 3D graphical components to the display screen (e.g., in a single pass operation) based, at least in part, on: the received specification of the one or more 3D graphical components; the first specification in 3D space of the viewer's point of view; and the determined one or more lighting effects.

In some embodiments, rendering the 2D representation of the one or more 3D graphical components to the display screen may further comprise: performing at least a first blending operation between two or more of the one or more 3D graphical components; and performing a second blending operation between the one or more 3D graphical components and another graphical component rendered to the display screen, wherein the first blending operation and second blending operation may be different types of blending operations (e.g., the first blending operation may be an additive blending operation, and the second blending operation may be an alpha blending operation).

In other embodiments, the device may further be configured to: receive a specification of a 2D graphical component within the scene; and determine based, at least in part, on the received specification of the 2D graphical component and characteristics of at least one of the one or more lighting sources within the scene, an occlusion mask for the 2D graphical component, wherein the occlusion mask specifies points of intersection between light emanating from the at least one of the one or more lighting sources within the scene and the 2D graphical component, and wherein the one or more lighting effects are further determined based, at least in part, on the occlusion mask. In some such embodiments, determining the one or more lighting effects based, at least in part, on the occlusion mask may further comprise: sampling values within the occlusion mask, wherein positions at which the occlusion mask is sampled are determined based on at least one of: a location of the 2D graphical component within the scene, the viewer's point of view, or a location of the one or more lighting sources within the scene.

Exemplary Extended Reality (XR) Devices

A person can interact with and/or sense a physical environment or physical world without the aid of an electronic device. A physical environment can include physical features, such as a physical object or surface. An example of a physical environment is a physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly- or partially-simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, wearable device, or the like) and adjust graphical content and/or auditory content presented to the user—e.g., similarly to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples includes: heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment.

A head mountable system may also have a transparent or translucent display, rather than an opaque display. The transparent or translucent display can have a medium through which light is directed to a user's eyes. The display may utilize various display technologies, such as ULEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies, can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

For purposes of this disclosure, a multiuser communication session can include an XR environment in which two or more devices are participating, while a single user session refers to an XR environment in which only one device is participating.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that, in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming but would nevertheless be a routine undertaking for those of ordinary skill in the design and implementation of graphics rendering systems, having the benefit of this disclosure.

Exemplary Calculation of Intersection Points between Viewer Point of View and 3D Graphical Components Referring now to FIG. 1, an example 100 of calculating points of intersection (106) between a viewer's (102) point of view (110) and a 3D graphical component (120) is illustrated, according to one or more embodiments. As shown in FIG. 1, viewer 102's point of view, as represented by exemplary ray 110, extends in a straight line from the viewer's eye towards exemplary 3D graphical component 120. In this example, the exemplary ray 110 representing the viewer's point of view intersects with graphical component 120 at two different points in three-dimensional space: point $106_1$ at a distance to (114) from viewer 102 and point $106_2$ at a distance $t_1$ (116) from viewer 102. Also illustrated in FIG. 1 are calculated normal vectors $108_1$ and $108_2$ for points $106_1$ and $106_2$, respectively. As is known in the graphical rendering arts, by defining the exterior surface (i.e., geometry) of a 3D graphical component, a rendering engine will know how to display the textures or material on the display screen of the device. The normal vectors may also help the rendering engine to understand how ambient light rays will bounce off the surface of the graphical component.

In some embodiments, it may be desirable to render a 2D representation of the 3D graphical component on the display screen of the device, e.g., such as within an XR environment. To do so, the device may select a particular point in 3D space, here, at point 112, at which to "slice" the 3D graphical component, thereby creating a display plane 104. As may now be appreciated, certain intersection points of rays emanating from viewer 102's point of view may intersect with graphical component 120 in front of the display plane 104 (e.g., point $106_1$), while other intersection points of rays emanating from viewer 102's point of view may intersect with graphical component 120 behind the display plane 104 (e.g., point $106_2$). Thus, depending on the blending scheme utilized to render the 2D representation of graphical component 120 at point 112, the viewer may or may not be able to see any influence of point $106_2$. For example, if the surface of graphical component 120 is completely opaque at point $106_1$, then the viewer's view of point $106_2$ may be completely occluded. As mentioned above, according to some embodiments, the rendering of the 2D representation of the 3D graphical component may preferably take place in a single rendering pass operation. Once rendered, the view of the 2D representation of the object may then easily be animated, simply by rotating the sampling positions and/or changing the placement of display plane 104 and/or the position of the viewer 102 with respect to the graphical component.

Exemplary Light Occlusion Mask Precomputation Techniques

Figure 2:
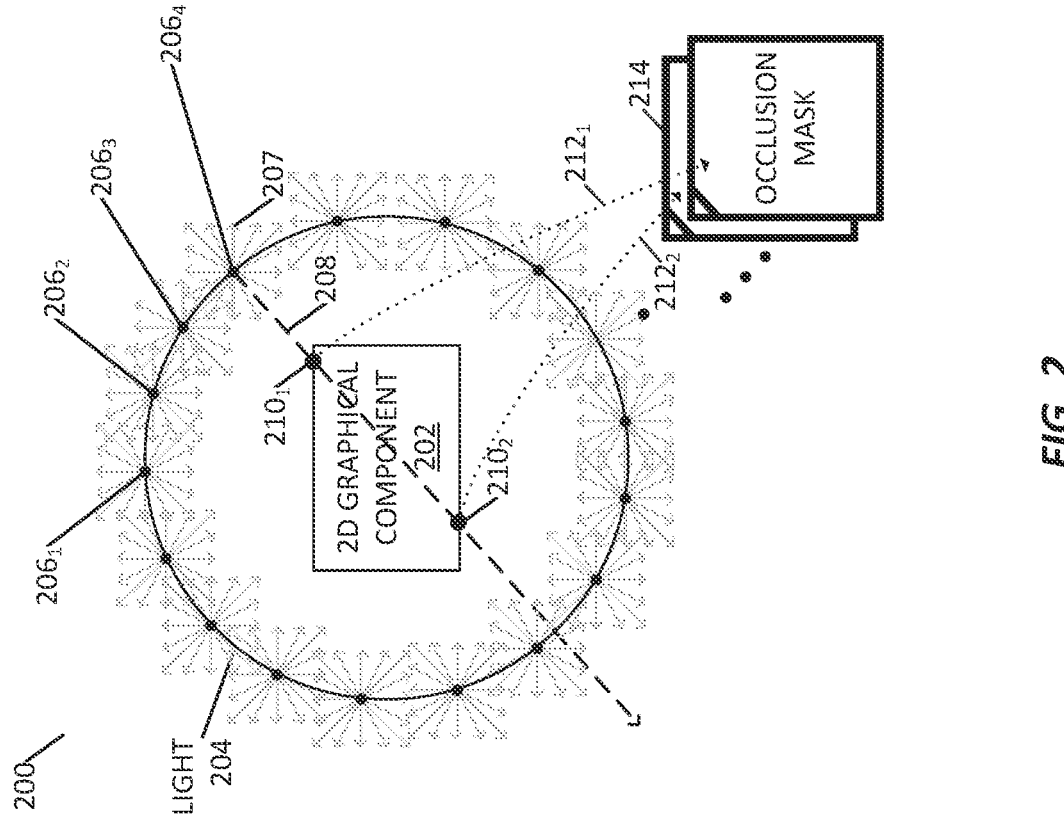
FIG. 2 shows an example of a precomputed light occlusion mask for a 2D graphical component, according to one or more embodiments.

Referring now to FIG. 2, an example 200 of a precomputed light occlusion mask 214 for a 2D graphical component 202 is shown, according to one or more embodiments. In example 200, a hypothetical light source (i.e., light ring 204) may be generated by the device to simulate the effects of light emanating around graphical component 202 and sample at which points (and in which directions) the incoming light rays would be occluded by the graphical component 202. The results of this analysis may be a so-called "precomputed light occlusion mask" 214, which may later be used in the rendering of enhanced lighting effects around a 3D object (and/or a 2D representation of a 3D object), such as may be rendered for a viewer in an XR environment.

Light source 204 may be represented by hundreds (or thousands) of individual point light sources 206 (e.g., $206_1$, $206_2$, $206_3$, $206_4$, etc.). Each individual point light source may simulate hundreds (or thousands) of individual light rays (e.g., ray 207), emanating in every direction from their respective point light source 206. Certain rays (e.g., ray 208) may intersect with graphical component 202 in one or more locations, which may be precomputed. For example, as illustrated in FIG. 2, ray 208 intersects with graphical component 202 for a first time at point $210_1$ and for a second time at point $210_2$. It is to be understood that a greater (or smaller) number of intersection points with graphical component 202 are possible for any given ray.

According to some embodiments, the computed intersection points of the simulated light rays with the graphical component 202 may be stored in precomputed light occlusion mask 214. In some such embodiments, precomputed light occlusion mask 214 may be stored in the form of one or more 2D texture maps. For example, as shown in FIG. 2, a location of point $210_1$ may be stored ($212_1$) at in a corresponding position of a first 2D texture map of precomputed light occlusion mask 214, while a location of point $210_2$ may be stored ($212_2$) at in a corresponding position of a second 2D texture map of precomputed light occlusion mask 214. It is to be understood that this representation of the precomputed light occlusion mask 214 is purely exemplary, and the intersection information may be stored in any desired format and structure, such as an array, linked list, or the like.

As alluded to above, according to some embodiments, when determining one or more lighting effects to be rendered on (or around) the graphical component, the various values stored within the occlusion mask may be sampled to determine if (and where) light rays will be occluded by the graphical object, wherein positions at which the occlusion mask is sampled are determined based on at least one of: a location of the graphical component within the scene being rendered, the viewer's point of view, or a location of the one or more lighting sources within the scene.

One advantage of using such precomputed light occlusion masks is that, when later attempting to render 3D volumetric lighting effects, it is not necessary to perform any light ray "marching" operations. Instead, with knowledge of the light source's location, the graphical component's location within the scene, and the viewer's point of view, the precomputed light occlusion mask can simply be sampled at the appropriate positions to determine if (and how) the light rays would intersect the graphical object.

Exemplary Methods of Rendering a 2D Representation of One or More 3D Graphical Components Referring now to FIG. 3, a flowchart 300 of a technique for rendering a 2D representation of one or more 3D graphical components to a display screen of a device in a single pass rendering operation is shown, according to one or more embodiments. First, at step 305, the method 300 may receive a specification of one or more three-dimensional (3D) graphical components. Next, at step 310, the method 300 may receive a first specification in 3D space of a viewer's point of view of the one or more 3D graphical components within a scene.

Next, at step 315, the method 300 may determine, based at least in part, on the received specification of the one or more 3D graphical components and the first specification in 3D space of the viewer's point of view: a.) one or more intersection points between the viewer's point of view and the one or more 3D graphical components (step 320), e.g., as described above with reference to FIG. 1, element 106; and b.) a normal vector corresponding to each of the one or more intersection points (step 325), e.g., as described above with reference to FIG. 1, element 108.

Next, at step 330, the method 300 may determine one or more lighting effects to be rendered upon the one or more 3D graphical components based, at least in part, on: the determined one or more intersection points; the normal vectors corresponding to the determined one or more intersection points; and characteristics of one or more lighting sources within the scene.

Finally, at step 335, the method 300 may render a 2D representation of the one or more 3D graphical components to a display screen of a device based, at least in part, on: the received specification of the one or more 3D graphical components; the first specification in 3D space of the viewer's point of view; and the determined one or more lighting effects.

It is to be understood that one or more of the steps described above with respect to exemplary method 300 may optionally be omitted and/or performed in a different sequence with the other steps of exemplary method 300.

Exemplary Block Diagram

Figure 4:
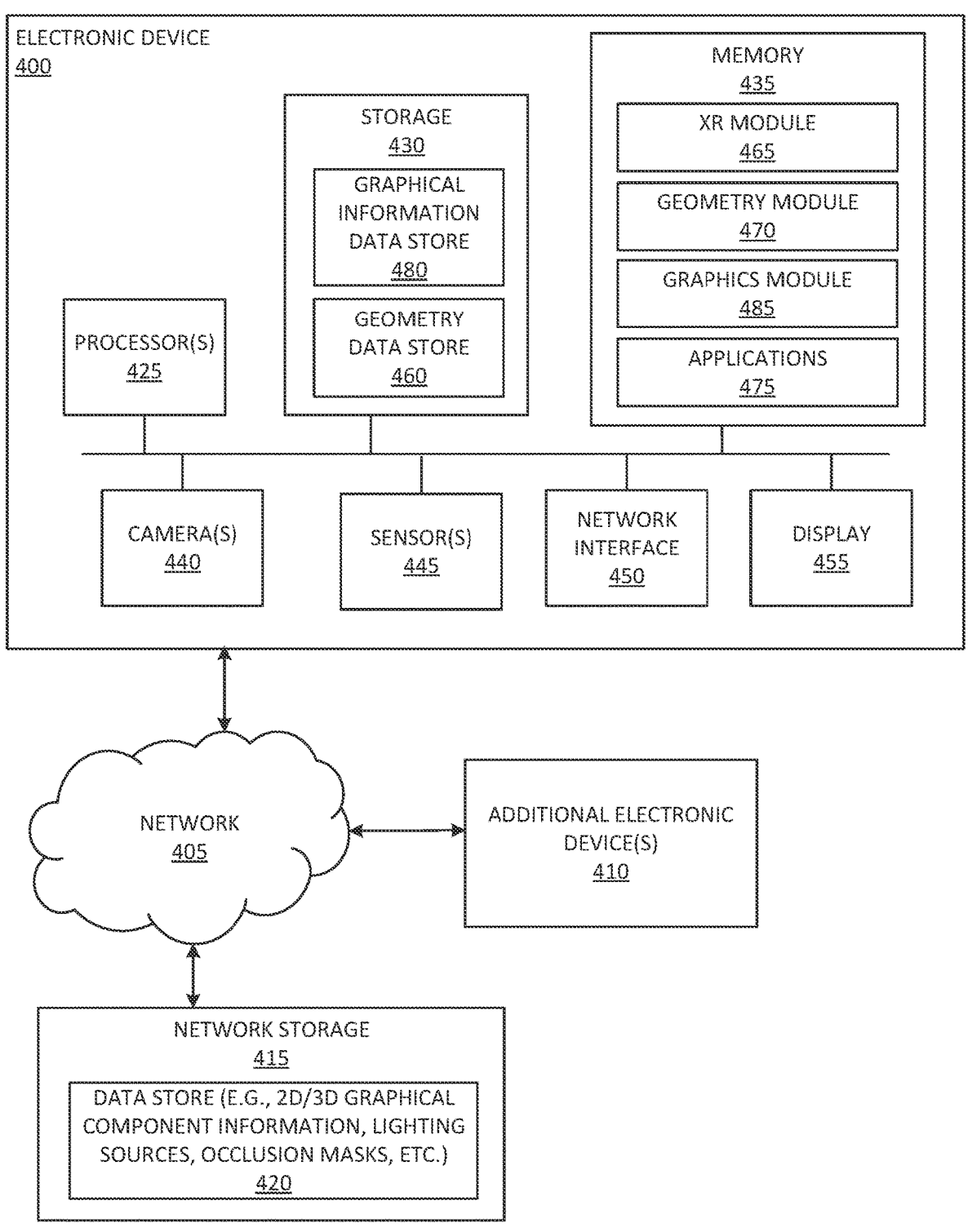
FIG. 4 shows, in block diagram form, a simplified system diagram according to one or more embodiments.

Referring now to FIG. 4, a simplified block diagram of an electronic device 400 is depicted, communicably connected to additional electronic devices 410 and a network storage 415 over a network 405, in accordance with one or more embodiments of the disclosure. Electronic device 400 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 400, additional electronic device 410, and/or network storage 415 may additionally, or alternatively, include one or more additional devices within which the various functionality may be contained, or across which the various functionality may be distributed, such as server devices, base stations, accessory devices, and the like. Illustrative networks, such as network 405 include, but are not limited to, a local network such as a universal serial bus (USB) network, an organization's local area network, and a wide area network such as the Internet. According to one or more embodiments, electronic device 400 may be utilized to participate in a single user or multiuser communication session in an XR environment. It should be understood that the various components and functionality within electronic device 400, additional electronic device 410 and network storage 415 may be differently distributed across the devices, or they may be distributed across additional devices.

Electronic Device 400 may include one or more processors 425, such as a central processing unit (CPU). Processor(s) 425 may include a system-on-chip such as those found in mobile devices and include one or more dedicated graphics processing units (GPUs). Further, processor(s) 425 may include multiple processors of the same or different type. Electronic device 400 may also include a memory 435. Memory 435 may include one or more different types of memory, which may be used for performing device functions in conjunction with processor(s) 425. For example, memory 435 may include cache, ROM, RAM, or any kind of transitory or non-transitory computer readable storage medium capable of storing computer readable code. Memory 435 may store various programming modules for execution by processor(s) 425, including XR module 465, geometry module 470, graphics module 485, and other various applications 475. Electronic device 400 may also include storage 430. Storage 430 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Electronic device may additionally include a network interface 450, from which the electronic device 400 can communicate across network 405.

Electronic device 400 may also include one or more cameras 440 or other sensors 445, such as depth sensor(s), from which depth or other characteristics of an environment may be determined. In one or more embodiments, each of the one or more cameras 440 may be a traditional RGB camera, or a depth camera. Further, cameras 440 may include a stereo- or other multi-camera system, a time-of-flight camera system, or the like. Electronic device 400 may also include a display 455. The display device 455 may utilize digital light projection, OLEDs, LEDs, ULEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 430 may be utilized to store various data and structures which may be utilized for providing state information in order to manage geometry data for physical environments of a local user and/or a remote user. Storage 430 may include, for example, geometry data store 460. Geometry data store 460 may be utilized to store data related to one or more physical environments in which electronic device 400 participates, e.g., in a single user session or a multiuser communication session. For example, geometry data store 460 may store characteristics of a physical environment, which may affect available space for presentation of components (e.g., 2D and/or 3D graphical components) during a single user sessions or multiuser communication sessions. As another example, geometry data store 460 may store characteristics of a physical environment, which may affect how a user is able to move around or interact with the physical environment around the device. Storage 430 may further include, for example, graphical information data store 480. Graphical information data store 480 may store characteristics of graphical information (e.g., depth information and/or color information) that may be composited and rendered in an image frame containing a representation of all or part of the user's physical environment. Additionally, or alternatively, geometry data and graphical information data (such as information specifying 2D and/or 3D graphical components, lighting sources, and/or occlusion masks, etc.) may be stored across network 405, such as by data store 420.

According to one or more embodiments, memory 435 may include one or more modules that comprise computer readable code executable by the processor(s) 425 to perform functions. The memory may include, for example, an XR module 465, which may be used to process information in an XR environment. The XR environment may be a computing environment which supports a single user experience by electronic device 400, as well as a shared, multiuser experience, e.g., involving collaboration with an additional electronic device(s) 410.

The memory 435 may also include a geometry module 470, for processing information regarding the characteristics of a physical environment, which may affect how a user moves around the environment or interacts with physical and/or virtual objects within the environment. The geometry module 470 may determine geometric characteristics of a physical environment, for example from sensor data collected by sensor(s) 445, or from pre-stored information, such as from geometry data store 460. Applications 475 may include, for example, computer applications that may be experienced in an XR environment by one or multiple devices, such as electronic device 400 and additional electronic device(s) 410. The graphics module 485 may be used, e.g., for processing information regarding characteristics of graphical information, including depth and/or color information, which may or may not be composited into an image frame depicting all or part of a user's physical environment)

Although electronic device 400 is depicted as comprising the numerous components described above, in one or more embodiments, the various components may be distributed across multiple devices. Accordingly, although certain processes are described herein, with respect to the particular systems as depicted, in one or more embodiments, the various processes may be performed differently, based on the differently-distributed functionality. Further, additional components may be used, some combination of the functionality of any of the components may be combined.

Exemplary Electronic Devices

Figure 5A:
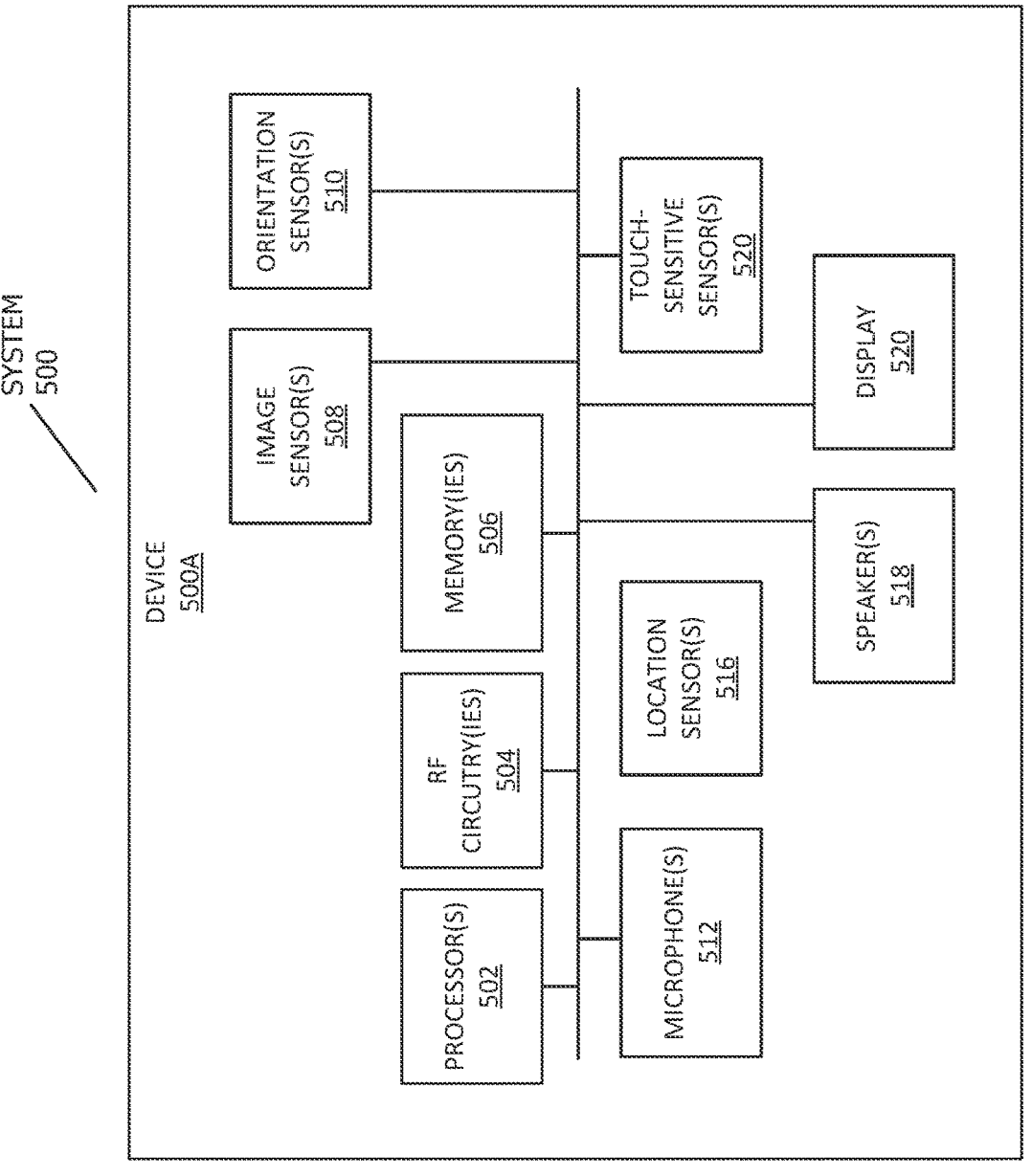
FIGS. 5A-5B show exemplary systems for use in various computer-simulated XR technologies.
Figure 5B:
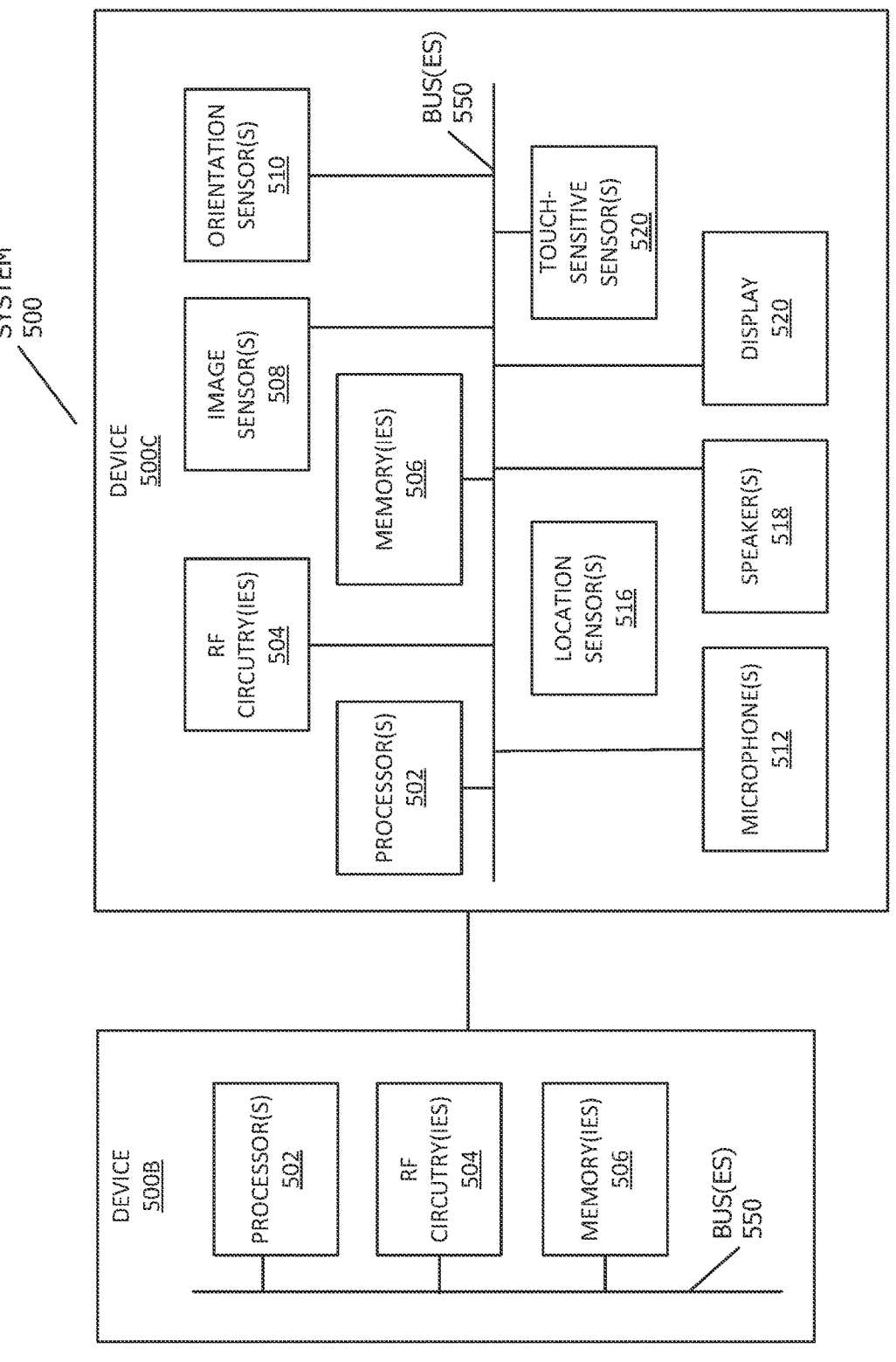

FIG. 5A and FIG. 5B depict exemplary system 500 for use in various extended reality (XR) technologies. In some examples, as illustrated in FIG. 5A, system 500 includes device 500A. Device 500A includes various components, such as processor(s) 502, RF circuitry(ies) 504, memory(ies) 506, image sensor(s) 508, orientation sensor(s) 510, microphone(s) 512, location sensor(s) 516, speaker(s) 518, display(s) 520, and touch-sensitive sensor(s) 522. These components optionally communicate over communication bus(es) 550 of device 500*a*.

In some examples, elements of system 500 are implemented in a base station device (e.g., a computing device, such as a remote server, mobile device, or laptop) and other elements of system 500 are implemented in a second device (e.g., a head-mounted device, or "HMD"). In some examples, device 500A is implemented in a base station device or a second device.

As illustrated in FIG. 5B, in some examples, system 500 includes two (or more) devices in communication, such as through a wired connection or a wireless connection. First device 500B (e.g., a base station device) includes processor(s) 502, RF circuitry(ies) 504, and memory(ies) 506. These components optionally communicate over communication bus(es) 550 of device 500C. Second device 500C (e.g., a head-mounted device, or "HMD") includes various components, such as processor(s) 502, RF circuitry(ies) 504, memory(ies) 506, image sensor(s) 508, orientation sensor(s) 510, microphone(s) 512, location sensor(s) 516, speaker(s) 518, display(s) 520, and touch-sensitive sensor(s) 522. These components optionally communicate over communication bus(es) 550 of device 500C.

System 500 includes processor(s) 502 and memory(ies) 506. Processor(s) 502 include one or more general processors, one or more graphics processors, and/or one or more digital signal processors. In some examples, memory(ies) 506 are one or more non-transitory computer-readable storage mediums (e.g., flash memory, random access memory) that store computer-readable instructions configured to be executed by processor(s) 502 to perform the techniques described below.

System 500 includes RF circuitry(ies) 504. RF circuitry(ies) 504 optionally include circuitry for communicating with electronic devices, networks, such as the Internet, intranets, and/or a wireless network, such as cellular networks and wireless local area networks (LANs). RF circuitry(ies) 504 optionally includes circuitry for communicating using near-field communication and/or short-range communication, such as Bluetooth®.

System 500 includes display(s) 520. Display(s) 520 may have an opaque display. Display(s) 520 may have a transparent or semi-transparent display that may incorporate a substrate through which light representative of images is directed to an individual's eyes. Display(s) 520 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 520 include heads up displays, automotive windshields with the ability to display graphics, windows with the ability to display graphics, lenses with the ability to display graphics, tablets, smartphones, and desktop or laptop computers. Alternatively, system 500 may be designed to receive an external display (e.g., a smartphone). In some examples, system 500 is a projection-based system that uses retinal projection to project images onto an individual's retina or projects virtual objects into a physical setting (e.g., onto a physical surface or as a holograph).

In some examples, system 500 includes touch-sensitive sensor(s) 522 for receiving user inputs, such as tap inputs and swipe inputs. In some examples, display(s) 520 and touch-sensitive sensor(s) 522 form touch-sensitive display(s).

System 500 includes image sensor(s) 508. Image sensors(s) 508 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 508 also optionally include one or more event camera(s) configured to capture movement of physical elements in the physical setting. Image sensor(s) 508 also optionally include one or more depth sensor(s) configured to detect the distance of physical elements from system 500. In some examples, system 500 uses CCD sensors, event cameras, and depth sensors in combination to detect the physical setting around system 500. In some examples, image sensor(s) 508 include a first image sensor and a second image sensor. The first image sensor and the second image sensor are optionally configured to capture images of physical elements in the physical setting from two distinct perspectives. In some examples, system 500 uses image sensor(s) 508 to receive user inputs, such as hand gestures. In some examples, system 500 uses image sensor(s) 508 to detect the position and orientation of system 500 and/or display(s) 520 in the physical setting. For example, system 500 uses image sensor(s) 508 to track the position and orientation of display(s) 520 relative to one or more fixed elements in the physical setting.

In some examples, system 500 includes microphones(s) 512. System 500 uses microphone(s) 512 to detect sound from the user and/or the physical setting of the user. In some examples, microphone(s) 512 includes an array of microphones (including a plurality of microphones) that optionally operate in tandem, such as to identify ambient noise or to locate the source of sound in space of the physical setting.

System 500 includes orientation sensor(s) 510 for detecting orientation and/or movement of system 500 and/or display(s) 520. For example, system 500 uses orientation sensor(s) 510 to track changes in the position and/or orientation of system 500 and/or display(s) 520, such as with respect to physical elements in the physical setting. Orientation sensor(s) 510 optionally include one or more gyroscopes and/or one or more accelerometers.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIG. 3 or the arrangement of elements shown in FIGS. 4 and 5A-5B should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein,".

The invention claimed is:

1. A device, comprising:
a memory;
a display screen; and
one or more processors operatively coupled to the memory, wherein the one or more processors are configured to execute instructions causing the one or more processors to:
receive a specification of one or more three-dimensional (3D) graphical components;
receive a first specification in 3D space of a viewer's point of view of the one or more 3D graphical components within a scene;
determine, based at least in part, on the received specification of the one or more 3D graphical components and the first specification in 3D space of the viewer's point of view:
a) one or more intersection points between the viewer's point of view and the one or more 3D graphical components; and
b) a normal vector corresponding to each of the one or more intersection points;
receive a specification of a 2D graphical component within the scene;

determine, based at least in part, on the received specification of the 2D graphical component and characteristics of at least one of the one or more lighting sources within the scene:
c) an occlusion mask for the 2D graphical component, wherein the occlusion mask specifies points of intersection between light emanating from the at least one of the one or more lighting sources within the scene and the 2D graphical component;
determine one or more lighting effects to be rendered upon the one or more 3D graphical components and the 2D graphical component based, at least in part, on: the determined one or more intersection points; the normal vectors corresponding to the determined one or more intersection points; the occlusion mask; and characteristics of one or more lighting sources within the scene; and
render a two-dimensional (2D) representation of the one or more 3D graphical components and the 2D graphical component to the display screen based, at least in part, on: the received specification of the one or more 3D graphical components; the first specification in 3D space of the viewer's point of view; the received specification of the 2D graphical component; and the determined one or more lighting effects.

2. The device of claim 1, wherein the instructions causing the one or more processors to render the 2D representation of the one or more 3D graphical components and the 2D graphical component to the display screen further comprise instructions causing the one or more processors to:
render the 2D representation of the one or more 3D graphical components and the 2D graphical component to the display screen in a single pass operation.

3. The device of claim 2, wherein the instructions causing the one or more processors to render the 2D representation of the one or more 3D graphical components and the 2D graphical component to the display screen further comprise instructions causing the one or more processors to:
perform at least a first blending operation between two or more of the one or more 3D graphical components; and
perform a second blending operation between the one or more 3D graphical components and another graphical component rendered to the display screen,
wherein the first blending operation and second blending operation are different types of blending operations.

4. The device of claim 3, wherein the first blending operation comprises an additive blending operation, and wherein the second blending operation comprises an alpha blending operation.

5. The device of claim 1, wherein the one or more lighting sources within the scene comprise at least one of: a virtual lighting source; or a real lighting source.

6. The device of claim 1, wherein the characteristics of the one or more lighting sources within the scene comprise at least one of: light color, light intensity, light angle, light placement, and light distance from the viewer.

7. The device of claim 1, wherein determining the one or more lighting effects based, at least in part, on the occlusion mask comprises: sampling values within the occlusion mask, wherein positions at which the occlusion mask is sampled are determined based on at least one of: a location of the 2D graphical component within the scene, the viewer's point of view, or a location of the one or more lighting sources within the scene.

8. A non-transitory program storage device comprising instructions stored thereon to cause one or more processors to:

receive a specification of one or more three-dimensional (3D) graphical components;

receive a first specification in 3D space of a viewer's point of view of the one or more 3D graphical components within a scene;

determine, based at least in part, on the received specification of the one or more 3D graphical components and the first specification in 3D space of the viewer's point of view:

a) one or more intersection points between the viewer's point of view and the one or more 3D graphical components; and b) a normal vector corresponding to each of the one or more intersection points;

receive a specification of a 2D graphical component within the scene;

determine, based at least in part, on the received specification of the 2D graphical component and characteristics of at least one of the one or more lighting sources within the scene:

c) an occlusion mask for the 2D graphical component, wherein the occlusion mask specifies points of intersection between light emanating from the at least one of the one or more lighting sources within the scene and the 2D graphical component;

determine one or more lighting effects to be rendered upon the one or more 3D graphical components and the 2D graphical component based, at least in part, on: the determined one or more intersection points; the normal vectors corresponding to the determined one or more intersection points; the occlusion mask; and characteristics of one or more lighting sources within the scene; and render a two-dimensional (2D) representation of the one or more 3D graphical components and the 2D graphical component to a display screen of a device based, at least in part, on: the received specification of the one or more 3D graphical components; the first specification in 3D space of the viewer's point of view; the received specification of the 2D graphical component; and the determined one or more lighting effects.

9. The non-transitory program storage device of claim 8, wherein the instructions causing the one or more processors to render the 2D representation of the one or more 3D graphical components and the 2D graphical component to the display screen further comprise instructions causing the one or more processors to:

render the 2D representation of the one or more 3D graphical components and the 2D graphical component to the display screen in a single pass operation.

10. The non-transitory program storage device of claim 9, wherein the instructions causing the one or more processors to render the 2D representation of the one or more 3D graphical components and the 2D graphical component to the display screen further comprise instructions causing the one or more processors to:

perform at least a first blending operation between two or more of the one or more 3D graphical components; and perform a second blending operation between the one or more 3D graphical components and another graphical component rendered to the display screen, wherein the first blending operation and second blending operation are different types of blending operations.

11. The non-transitory program storage device of claim 10, wherein the first blending operation comprises an additive blending operation, and wherein the second blending operation comprises an alpha blending operation.

12. The non-transitory program storage device of claim 8, wherein determining the one or more lighting effects based, at least in part, on the occlusion mask comprises: sampling values within the occlusion mask, wherein positions at which the occlusion mask is sampled are determined based on at least one of: a location of the 2D graphical component within the scene, the viewer's point of view, or a location of the one or more lighting sources within the scene.

13. An image processing method, comprising:

receiving a specification of one or more three-dimensional (3D) graphical components;

receiving a first specification in 3D space of a viewer's point of view of the one or more 3D graphical components within a scene;

determining, based at least in part, on the received specification of the one or more 3D graphical components and the first specification in 3D space of the viewer's point of view:

a) one or more intersection points between the viewer's point of view and the one or more 3D graphical components; and b) a normal vector corresponding to each of the one or more intersection points;

receiving a specification of a 2D graphical component within the scene;

determining, based at least in part, on the received specification of the 2D graphical component and characteristics of at least one of the one or more lighting sources within the scene:

c) an occlusion mask for the 2D graphical component, wherein the occlusion mask specifies points of intersection between light emanating from the at least one of the one or more lighting sources within the scene and the 2D graphical component;

determining one or more lighting effects to be rendered upon the one or more 3D graphical components and the 2D graphical component based, at least in part, on: the determined one or more intersection points; the normal vectors corresponding to the determined one or more intersection points; the occlusion mask; and characteristics of one or more lighting sources within the scene; and rendering a two-dimensional (2D) representation of the one or more 3D graphical components and the 2D graphical component to a display screen of a device based, at least in part, on: the received specification of the one or more 3D graphical components; the first specification in 3D space of the viewer's point of view; the received specification of the 2D graphical component; and the determined one or more lighting effects.

14. The method of claim 13, wherein rendering the 2D representation of the one or more 3D graphical components and the 2D graphical component to the display screen further comprises:

rendering the 2D representation of the one or more 3D graphical components and the 2D graphical component to the display screen in a single pass operation.

15. The method of claim 14, wherein rendering the 2D representation of the one or more 3D graphical components and the 2D graphical component to the display screen further comprises:

performing at least a first blending operation between two or more of the one or more 3D graphical components; and performing a second blending operation between the one or more 3D graphical components and another graphical component rendered to the display screen, wherein the first blending operation and second blending operation are different types of blending operations.

16. The method of claim 15, wherein the first blending operation comprises an additive blending operation, and wherein the second blending operation comprises an alpha blending operation.

17. The method of claim 13, wherein determining the one or more lighting effects based, at least in part, on the occlusion mask comprises: sampling values within the occlusion mask, wherein positions at which the occlusion mask is sampled are determined based on at least one of: a location of the 2D graphical component within the scene, the viewer's point of view, or a location of the one or more lighting sources within the scene.

18. The non-transitory program storage device of claim 8, wherein the one or more lighting sources within the scene comprise at least one of: a virtual lighting source; or a real lighting source.

19. The non-transitory program storage device of claim 8, wherein the characteristics of the one or more lighting sources within the scene comprise at least one of: light color, light intensity, light angle, light placement, and light distance from the viewer.

20. The method of claim 13, wherein the characteristics of the one or more lighting sources within the scene comprise at least one of: light color, light intensity, light angle, light placement, and light distance from the viewer.

*    *    *    *    *